(12) United States Patent
Takaya et al.

(10) Patent No.: US 7,888,276 B2
(45) Date of Patent: Feb. 15, 2011

(54) GLASS FOR DISPLAY SUBSTRATE

(75) Inventors: Tatsuya Takaya, Otsu (JP); Masahiro Tomamoto, Otsu (JP)

(73) Assignee: Nippon Electric Glass Co., Ltd., Otsu (JP)

( * ) Notice: Subject to any disclaimer, the term of this patent is extended or adjusted under 35 U.S.C. 154(b) by 1728 days.

(21) Appl. No.: 11/083,937

(22) Filed: Mar. 21, 2005

(65) Prior Publication Data

US 2005/0209084 A1    Sep. 22, 2005

(30) Foreign Application Priority Data

Mar. 22, 2004 (JP) .............................. 2004-082415
Jan. 31, 2005 (JP) .............................. 2005-022809

(51) Int. Cl.
*C03C 3/093* (2006.01)
*C03C 3/091* (2006.01)

(52) U.S. Cl. .......................................... 501/67; 501/66

(58) Field of Classification Search .................. 501/66, 501/67
See application file for complete search history.

(56) References Cited

U.S. PATENT DOCUMENTS 6,881,692 B2 * 4/2005 Murata et al. .................. 501/66
2001/0034293 A1 * 10/2001 Peuchert et al. ............... 501/66
2001/0034294 A1 * 10/2001 Peuchert et al. ............... 501/66
2002/0013210 A1 * 1/2002 Peuchert et al. ............... 501/66
2002/0151426 A1 * 10/2002 Murata et al. ................. 501/66
2002/0183188 A1 * 12/2002 Peuchert ....................... 501/66
2004/0209758 A1 * 10/2004 Peuchert et al. ............... 501/66
2004/0220039 A1 * 11/2004 Peuchert ....................... 501/66
2005/0065014 A1 * 3/2005 Narita et al. .................. 501/66
2008/0194394 A1 * 8/2008 Lecomte ....................... 501/67

FOREIGN PATENT DOCUMENTS

| CN | 1460091 A | 12/2003 |
|---|---|---|
| DE | 197 33 580 A1 | 2/1999 |
| JP | 2002-308643 A | 10/2002 |
| WO | 02/060831 A2 | 8/2002 |

* cited by examiner

*Primary Examiner*—Karl E Group
*Assistant Examiner*—Elizabeth A Bolden
(74) *Attorney, Agent, or Firm*—Kubovcik & Kubovcik

(57) ABSTRACT

A glass having a $SiO_2$—$Al_2O_3$—$B_2O_3$—RO (RO is at least one of MgO, CaO, BaO, SrO and ZnO) based composition, a temperature corresponding to $10^{2.5}$ poise being 1570° C. or higher and an alkali content of 0.01 to 0.2% and a $ZrO_2$ content of 0.01 to 0.3%, as expressed in % by mass. And, a glass having a $SiO_2$—$Al_2O_3$—$B_2O_3$—RO (RO is at least one of MgO, CaO, BaO, SrO and ZnO) based composition, a density of 2.5 g/cm³ or less, an average thermal expansion coefficient of 25 to $36 \times 10^{-7}$/° C. in a temperature range of 30 to 380° C., a strain point of 640° C. or higher and an alkali content of 0.01 to 0.2% and a $ZrO_2$ content of not less than 0.01% and less than 0.4%, as expressed in % by mass.

8 Claims, No Drawings

GLASS FOR DISPLAY SUBSTRATE

This application claims priority based on Japanese patent application Nos. 2004-82415 and 2005-22809 filed Mar. 22, 2004, and Jan. 31, 2005, respectively, which are incorporated herein by reference.

BACKGROUND OF THE INVENTION

1. Field of the Invention

The present invention relates to a glass for a substrate which is used in a flat display substrate such as a liquid crystal display and an EL display.

2. Description of the Related Art

An alkali-free glass substrate has been widely used as a flat display substrate such as a liquid crystal display and an EL display.

In particular, since an electron device such as a thin film transistor-type active matrix liquid crystal display (TFT-LCD) is a thin-type and has a small consumption power, the device has been used in various utilities such as car navigation and a finder of a digital camera and, in recent years, a monitor of a personal computer and a TV.

In a TFT-LCD panel maker, improvement in productivity and cost reduction are tried by manufacturing plural devices on a glass substrate, which formed by a glass maker, and dividing into every device to obtain a product. In recent years, in utilities such as a monitor of a personal computer or a TV, a large size has been required in a device itself and, in order to produce a plurality of such kind of large devices at one time, therefore a glass substrate having a large area such as 1000× 1200 mm has been required.

In addition, in a portable-type device such as a cellular phone and a note-type personal computer, for convenience for carrying, weight reduction of an instrument is required, and weight reduction is also required in a glass substrate. In order to reduce a weight of a glass substrate, thickness reduction of a substrate is effective and, currently, a standard thickness of a glass substrate for TFT-LCD is very thin such as about 0.7 mm.

However, the aforementioned large-sized thin glass substrate has great sag due to a self-weight, and this has become a great problem in a manufacturing step.

That is, this kind of a glass substrate is formed by a glass maker, and passed through steps such as cutting, annealing, inspection and washing. During these steps, the glass substrate is placed into or taken out from a cassette in which a multiple-staged shelf is formed. This cassette can hold glass substrates in a horizontal direction such that both sides or three sides of the glass substrate are supported only by shelves formed on left and right inside walls, or left, right and back inside walls. However, since a large-sized thin glass substrate has a large amount of sag, when a glass substrate is placed into a cassette, a part of the glass substrate is contacted with the cassette or another glass substrate leading to breakage, or when the glass substrate is taken out from the cassette, it is greatly rocked, easily leading to unstability. On the other hand, in a display maker, since the same form of the cassette is used, the similar problem arises.

A sag amount due to a self-weight of such the glass substrate varies in proportion to a glass density and in inverse proportion to a Young's modulus. Accordingly, in order to suppress a sag amount of a glass substrate small, it is necessary that a specific Young's modulus expressed by a ratio of Young's modulus/density is increased. In order to increase a specific Young's modulus, a glass material having a high Young's modulus and a low density becomes necessary and, at the same specific Young's modulus, in a glass having a lower density, a thickness of a glass sheet having the same weight can be increased by a portion of a reduced weight. Since a sag amount of a glass varies in reverse proportion to a square of a sheet thickness, effect of reducing sag derived from increase in a sheet thickness is very great. Since reduction in a glass density has great effect also on weight reduction of a glass, the glass having as smaller as possible density is better.

Generally, this kind of an alkali-free glass contains a relatively large amount of an alkaline earth metal oxide. In order to reduce a density of the glass, it is effective to reduce a content of the alkaline earth metal oxide. However, since the alkaline earth metal oxide is a component which promotes meltability of a glass, meltability is reduced when the content is decreased. When meltability of a glass is reduced, internal defects such as seeds and stones easily occur in the glass. Since seeds and stones in a glass prevent transmission of light, this becomes a fatal defect to the glass substrate for display. In order to suppress such the internal defects, a glass must be melted at a high temperature for a long period of time. On the other hand, melting at a high temperature increases a burden on a glass melting furnace. A refractory used in the furnace is more eroded at a higher temperature, and a life cycle of the furnace becomes shorter.

In addition, in this kind of a glass substrate, thermal shock resistance is also an important requirement. A fine flaw and crack are present on an end face of a glass substrate even when chamfered and, when a tensile stress due to heat is exerted by concentrating on the flaw and the crack, the glass substrate is broken in some cases. Breakage of a glass substrate not only decreases an operation rate, but also a fine glass powder produced upon breakage is adhered on other glass substrates, and this causes disconnection and deteriorated patterning, thus, there is a possibility that manufacturing circumstances are contaminated.

Meanwhile, as a recent direction of development of TFT-LCD, in addition to increase in a size of a screen and weight reduction, increase in performance such as a higher definition, a higher speed response and a higher aperture ratio is exemplified. In particular, in recent years, for the purpose of increase in performance and weight reduction of a liquid crystal display, polycrystalline silicon TFT-LCD (p-Si.TFT-LCD) has been extensively developed. In the previous p-Si.TFT-LCD, since a temperature at its manufacturing step is very high such as 800° C. or higher, only a quartz glass substrate could be used. However, by recent development, a temperature at a manufacturing step is lowered to 400 to 600° C., and an alkali-free glass substrate has become to be used as in amorphous silicon TFT-LCD (a-Si.TFT-LCD) which is currently produced at a large scale.

In a step of manufacturing p-Si.TFT-LCD, since there is many heat-treating steps and a glass substrate is repeatedly heated rapidly and cooled rapidly as compared with a step of manufacturing a-Si.TFT-LCD, thermal shock on the glass substrate is further increased. Further, a size of a glass substrate is increased as described above, not only there easily arises a difference in a temperature of the glass substrate, but also a possibility that fine flaws and cracks are produced on an end face is also increased. Therefore a possibility that the substrate is broken during a heating step is increased. The most fundamental and effective method for solving this problem is to reduce a thermal stress generated from a difference in thermal expansion and, for this reason, a glass having a low thermal expansion coefficient is required. In addition, since when a difference in thermal expansion between a thin film transistor (TFT) material and glass becomes great, warpage occurs in the glass substrate, it is also required to have a thermal expansion coefficient approximate to that (about 30 to 33×10$^{-7}$/° C.) of a TFT material such as p-Si.

In addition, it is said that a temperature at a step of manufacturing p-Si.TFT-LCD has been lowered recently, but the temperature is still significantly higher as compared with a temperature at a step of manufacturing a-Si.TFT-LCD. If a glass substrate has a low heat resistance, when the glass substrate is exposed to a high temperature of 400 to 600° C. during the step of manufacturing p-Si.TFT-LCD, fine dimensional shrinkage called thermal compaction is caused, and this causes variance of a pixel pitch of TFT, and this may be a cause for deteriorated display. In addition, if a glass substrate has a further lower heat resistance, there is a possibility that deformation and warpage of the glass substrate are caused. Further, also in order to prevent occurrence of pattern shift by thermal compaction of a glass substrate at a step of manufacturing a LCD such as film deposition step, the glass excellent in heat resistance is required.

Further, on a surface of a glass substrate for TFT-LCD, a transparent electrically conductive film, an insulating film, a semiconductor film and a metal film are formed and, moreover, various circuits and patterns are formed by photolithography etching (photoetching). In addition, in these film formation and photoetching step, the glass substrate is subjected to various heat treatment and chemical treatment.

Therefore, when an alkali metal oxide ($Na_2O$, $K_2O$, $Li_2O$) is contained in a glass, it is thought that an alkali ion is diffused into a formed semiconductor substance film during heat treatment, leading to deterioration of film property, and it is required that an alkali metal oxide is not substantially contained. Further, it is required that such the chemical resistance is possessed that deterioration is not caused by chemicals such as various acids and alkalis used in a photoetching step.

In addition, a glass substrate for TFT-LCD is formed mainly by a down-draw process or a float process. Examples of a down-draw process include a slot down-draw process and an overflow down-draw process and, since a glass substrate formed by the down-draw process does not need polishing process, there is an advantage that cost reduction is easy. However, when a glass substrate is formed by a down-draw process, since the glass is easily devitrified, the glass excellent in devitrification resistance is required.

Then, an alkali-free glass for a substrate characterized in that the aforementioned various properties are satisfied and, in particular, a low density, low expansion, and a high strain point are possessed is proposed (e.g. Japan Unexamined Patent Publication JP-A No. 2002-308643).

The alkali-free glass having a low density, low expansion and a high strain point disclosed in JP-A No. 2002-308643 has a density of 2.45 g/cm$^3$ or a lower, an average thermal expansion coefficient in a temperature range of 30 to 380° C. of 25 to 36×10$^{-7}$/° C., and a strain point of 640° C. or higher, thus, the aforementioned requirements are satisfied. However, the aforementioned alkali-free glass has a melting temperature (temperature corresponding to 10$^{2.5}$ poise) of approximately 1580° C. or higher, and high temperature melting is necessary.

Then, electric melting is frequently applied to high temperature melting of such the glass. In the case of electric melting, a glass melting furnace is usually constructed of an alumina electrocast refractory having a high electric resistance. However, the alumina electrocast refractory is easily eroded by glass melt as compared with, for example, a high zirconia refractory, and has a short life. In particular, when an alumina electrocast refractory is used in a furnace for melting a glass requiring the aforementioned high temperature melting, the refractory is eroded in a short period of time, and stable operation can not be performed over a long period of time. As a result, a melting furnace must be frequently repaired, productivity is reduced, and a facility cost is increased. In addition, when an alumina electrocast is used, lots of seeds are generated from the refractory.

Under such the circumstances, use of an electric melting furnace using a high zirconia refractory having erosion resistance and hardly generating seeds is being studied. However, when the aforementioned glass having a low density, low expansion, and a high strain point is electrically melted in a melting furnace using a high zirconia refractory, there arises a problem that the glass is easily devitrified in a later forming step.

SUMMARY OF THE INVENTION

An object of the present invention is to provide a glass for a display substrate which has a low density, low expansion and a high strain point, and hardly causes devitrification at forming even when electrically melted in a melting furnace constructed of a high zirconia refractory, and a process for preparing the same.

A glass for a display substrate of the present invention is characterized in that the glass has a $SiO_2$—$Al_2O_3$—$B_2O_3$—RO (RO is at least one of MgO, CaO, BaO, SrO and ZnO) based composition, a temperature corresponding to 10$^{2.5}$ poise is 1570° C. or higher, preferably 1580° C. or higher and, expressed in % by mass, a content of an alkali is 0.01 to 0.2%, and a content of $ZrO_2$ is not less than 0.01% and less than 0.4%.

In addition, a glass for a display substrate of the present invention is characterized in that the glass has the $SiO_2$—$Al_2O_3$—$B_2O_3$—RO (RO is at least one of MgO, CaO, BaO, SrO and ZnO) based composition, a density is 2.5 g/cm$^3$ or less, an average thermal expansion coefficient in a temperature range of 30 to 380° C. is 25 to 36×10$^{-7}$/° C., a strain point 640° C. or higher and, expressed in % by mass, a content of an alkali is 0.01 to 0.2%, and a content of $ZrO_2$ is not less than 0.01% and less than 0.4%.

In addition, in the glass for a display substrate of the present invention, the content of $ZrO_2$ expressed in % by mass is preferably 0.01 to 0.3%, and an alkali component is preferably such that, expressed in % by mass, 0.007 to 0.2% of $Na_2O$, 0 to 0.05% of $Li_2O$, and 0 to 0.05% of $K_2O$ are contained.

In addition, in the glass for display substrate of the present invention, it is preferable that a β-OH value of the glass is 0.20/mm or more.

In addition, in the glass for a display substrate of the present invention, it is preferable that, expressed in % by mass, 50 to 70% of $SiO_2$, 10 to 25% of $Al_2O_3$, 8.4 to 20% of $B_2O_3$, 0 to 10% of MgO, 6 to 15% of CaO, 0 to 10% of BaO, 0 to 10% of SrO, 0 to 10% of ZnO, 0 to 5% of $TiO_2$, and 0 to 5% of $P_2O_5$ are contained.

In addition, it is preferable that the glass for a display substrate of the present invention is 0.1 m$^2$ or more in area.

In addition, it is preferable that the glass for a display substrate of the present invention is used as a liquid crystal display substrate or an EL display substrate.

A method of using a glass for a display substrate of the present invention is characterized in that the glass for a display substrate is used as a substrate for a liquid crystal display or an EL display.

A method for producing a glass for a display substrate of the present invention is a method for producing a glass for a display substrate by electrically melting glass raw materials mixed so that the glass having a $SiO_2$—$Al_2O_3$—$B_2O_3$—RO (RO is at least one of MgO, CaO, BaO, SrO and ZnO) based composition and having a temperature corresponding to $10^{2.5}$ poise of 1580° C. or higher is obtained, in a melting furnace constructed of a high zirconia refractory, and refining, homogenizing and forming the melt, characterized in that the glass raw materials are mixed so that a content of an alkali of the resulting glass is 0.01 to 0.2% as expressed in % by mass.

In addition, a method for producing a glass for a display substrate of the present invention is a method for producing a glass for a display substrate by electrically melting glass raw materials mixed so that the glass having a $SiO_2$—$Al_2O_3$—$B_2O_3$—RO (RO is at least one of MgO, CaO, BaO, SrO and ZnO) based composition, a density of 2.5 g/cm$^3$ or less, an average thermal expansion coefficient in a temperature range of 30 to 380° C. of 25 to 36×10$^{-7}$/° C., and a strain point of 640° C. or higher is obtained, in a melting furnace constructed of a high zirconia refractory, and refining, homogenizing and forming the melt, characterized in that the glass raw materials are mixed so that a content of an alkali of the obtained glass is 0.01 to 0.2% as expressed in % by mass.

In addition, in the method for producing a glass for a display substrate of the present invention, it is preferable that the glass raw materials are mixed so that an alkali component is 0.007 to 0.2% of $Na_2O$, 0 to 0.05% of $Li_2O$, and 0 to 0.05% of $K_2O$ as expressed in % by mass.

In addition, in the method for producing a glass for a display substrate of the present invention, it is preferable that a β-OH value of the resultant glass is 0.20/mm or more.

In addition, in the method for producing a glass for a display substrate of the present invention, it is preferable that a content of $ZrO_2$ of the resultant glass is not less than 0.01% and less than 0.4%, particularly 0.01 to 0.3% as expressed in % by mass.

In addition, in the method for producing a glass for a display substrate of the present invention, it is preferable that the raw materials are mixed so that the glass comprising 50 to 70% of $SiO_2$, 10 to 25% of $Al_2O_3$, 8.4 to 20% of $B_2O_3$, 0 to 10% of MgO, 6 to 15% of CaO, 0 to 10% of BaO, 0 to 10% of SrO, 0 to 10% of ZnO, 0 to 5% of $TiO_2$, and 0 to 5% of $P_2O_5$ is obtained.

In addition, it is preferable that the glass for a display substrate of the present invention is prepared by the aforementioned process.

Since even when the glass for a display substrate of the present invention is electrically melted in a melting furnace constructed of a high zirconia refractory from necessity of high temperature melting, erosion of the refractory is little, the glass is hardly devitrified. Moreover, the glass has a low density, low expansion, and a high strain point, is small in a thermal compaction amount or a sag amount, is excellent in thermal shock resistance, and has warpage which is hardly occurred. For this reason, the glass is suitable as a glass for a liquid crystal display substrate.

In addition, according to the present method, although high temperature melting is necessary, a glass having no seed and no devitrification, and having a low density, low expansion and a high strain point can be produced without repairing a melting furnace for a long term, and the glass of high quality can be provided at a low cost.

DESCRIPTION OF THE PREFERRED EMBODIMENTS

According to research by the present inventors, a high zirconia refractory has a lower volume resistivity than that of the glass having a low density, low expansion and a high strain point, a representative of which is described in the above JP-A reference, in a melting temperature region of the glass. For this reason, when the aforementioned glass is electrically melted in an electric melting furnace constructed of the high zirconia refractory, a current is flown through not only the molten glass but also the refractory. As a result, the high zirconia refractory is eroded, and a concentration of $ZrO_2$ in the glass is increased, and it is presumed that this is a cause for devitrification at forming.

Then, in the present invention, the aforementioned problem is solved by daring addition of an alkali component which has been previously prohibited to be contained in utilities of, in particular, a liquid crystal display, in a glass having a temperature corresponding to $10^{2.5}$ poise of 1570° C. or higher, particularly 1580° C. or higher which needs high temperature melting, for the purpose of reducing a volume resistivity of the glass in a melting temperature region.

Specifically, the glass contains an alkali component (one or more kinds of $Li_2O$, $Na_2O$ and $K_2O$) at 0.01% or more, preferably 0.02% or more, further preferably 0.05% or more as expressed in % by mass. The upper limit is 0.2% by mass or less, preferably 0.1% by mass or less. It is thought that, by addition of a prescribed amount of an alkali component, a volume resistivity of the glass melt is reduced, a current easily passes through the glass melt during electric melting, and the current passes through the high zirconia refractory side with relative difficulty. As a result, erosion of the refractory is suppressed, and devitrification of the glass is improved. On the other hand, when the alkali component exceeds 0.2%, various properties of a film formed on the substrate are deteriorated due to diffusion of the alkali ion caused by heat treatment. In addition, there is a possibility that chemical durability of the resultant glass is reduced. In the present invention, the content of the alkali is very small, and reduction in the volume resistivity in a high temperature region caused by addition of the alkali is slight. However, this slight reduction in the volume resistivity influences on easiness of flow of the current into the high zirconia refractory, and it becomes possible to considerably reduce the erosion amount from the refractory. It is preferable that the amount of $Na_2O$, among the alkali component, is the largest. In addition, it is preferable that the content of $Na_2O$ alone is 0.007% or more, particularly 0.01% or more, and further 0.02% or more, and it is desirable that the content is 0.2% or less, 0.15% or less, particularly 0.08% or less. Although not essential regarding other alkali components, it is preferable that a content of $Li_2O$ is 0.0001% or more, particularly 0.0007% or more, further 0.001% or more, and it is desirable that the content is 0.05% or less, particularly 0.02% or less. In addition, it is preferable that a content of $K_2O$ is 0.0001% or more, particularly 0.001% or more, further 0.003% or more, and it is desirable that the content of 0.05% or less, particularly 0.02% or less.

In addition, the glass for a display substrate of the present invention contains 0.01% or more, preferably 0.02% or more of $ZrO_2$ as expressed in % by mass. Its upper limit is less than 0.4%, preferably 0.3% or less, more preferably 0.2% or less, further preferably 0.1% or less. When the content of $ZrO_2$ is 0.4% or more, the glass is easily devitrified. This tendency is remarkably manifested, particularly in a composition range of the present invention described later. In addition, also when $SnO_2$ is contained in the glass, tendency of devitrification of the glass due to $ZrO_2$ becomes strong. Like this, from a viewpoint of improvement in devitrification, a smaller amount of $ZrO_2$ is better. However, reduction in chemical durability due to addition of an alkali component is feared. In addition, it is not preferable to completely exclude $ZrO_2$ as an impurity from glass raw materials or a cullet since a raw material cost is increased. In addition, since the high zirconia refractory is used in a melting step, it is difficult to completely prevent the refractory from dissolving into the glass melt. Then, in the present invention, the lower limit value of $ZrO_2$ is set at 0.01%. By containing $ZrO_2$ at 0.01% or more, chemical durability of the glass can be expected to be improved. In addition, regarding $ZrO_2$, it is not necessary to use a raw material having an excessively high purity, and it becomes possible to avoid increase in a raw material cost.

In addition, in a glass requiring high temperature melting, even small reduction in a viscosity leads to improvement in meltability. For reducing the viscosity at high temperature, it is effective to increase moisture in the glass. Then, in the substrate glass of the present invention, it is preferable that the moisture amount of the glass as expressed by a β-OH value is 0.20/mm or more, particularly 0.25/mm or more, further 0.3/mm or more, desirably 0.4/mm or more. However, since there is a tendency that as the β-OH value grows higher, a strain point is reduced, it is desired that its upper limit is 0.65/mm or less, particularly 0.6/mm or less. The β-OH value of the glass is obtained by the following equation in an infrared-ray absorption spectrum of the glass.

$$\beta\text{-OH value}=(1/X)\log 10(T_1/T_2)$$

X: glass thickness (mm)
$T_1$: transmittance (%) at a reference wavelength of 3846 $cm^{-1}$
$T_2$: minimum transmittance (%) at hydroxy group absorption wavelength of around 3600 $cm^{-1}$ The moisture amount of the glass can be adjusted by a method of selecting raw materials having a high moisture amount (e.g. hydroxide raw material), or adding moisture to a raw material, or adjusting a content of a raw material for decreasing a moisture amount in a glass such as chlorine, or increasing a moisture amount in the atmosphere in a furnace by adopting oxygen combustion over melting of the glass, or introducing a water steam directly into a furnace, or performing water steam bubbling in the molten glass.

In addition, in the glass for a display substrate of the present invention, the density is 2.5 $g/cm^3$ or less (preferably 2.45 $g/cm^3$ or less, further preferably 2.42 $g/cm^3$ or less), the average thermal expansion coefficient in a temperature range of 30 to 380° C. is 25 to $36\times10^{-7}$/° C. (preferably 28 to $35\times10^{-7}$/° C.), and the strain point is 640° C. or higher (preferably 650° C. or higher). For this reason, thermal shock resistance is excellent, warpage is not caused due to approximation to a thermal expansion coefficient of a TFT material, weight reduction is possible, the sag amount can be reduced, and thermal compaction is small.

In addition, in the glass for a display substrate of the present invention, it is desirable that the liquidus temperature is 1150° C. or lower (particularly 1130° C. or lower, further 1100° C. or lower), and the viscosity at the liquidus temperature is $10^{5.4}$ dPa·s or more (particularly $10^{6.0}$ dPa·s or more). By satisfying this condition, even when formed into a sheet by a down-draw process, devitrification is not caused, and it is possible to decrease a production cost by omitting a polishing step. Further, it is desirable that, when treated in a 10% HCl aqueous solution under condition of 80° C.-24 hours, its erosion amount is 10 μm or less, when treated in a 10% HCl aqueous solution under condition of 80° C.-3 hours, cloud or roughness is not recognized by surface observation with naked eyes, further when treated in a 130 BHF solution under condition of 20° C.-30 minutes, its erosion amount is 0.8 μm or less and, when treated in a 63 BHF solution under condition of 20° C.-30 minutes, cloud or roughness is not recognized by surface observation with naked eyes. In addition, it is desirable that the specific Young's modulus is 27.5 GPa/$g\cdot cm^{-3}$ or more (particularly 29.0 GPa·s or more). By satisfying this condition, the sag amount of the glass substrate can be reduced. Further, when the temperature of the glass melt at the viscosity of $10^{2.5}$ dPa·s is 1650° C. or lower, meltability becomes better.

In addition, in the glass for a display substrate of the present invention, by imparting properties of a low density and a high specific Young's modulus, reduction in workability is small even when the thickness is 0.6 mm or less (preferably 0.5 mm or less). That is, even when the thickness is reduced from 0.7 mm to 0.6 mm, the sag amount becomes smaller as compared with the previous glass substrate, and it becomes easy to prevent damage when the glass substrate is placed into or taken out from a cassette.

In addition, there is a tendency that a size of a glass substrate is being increased and, when the substrate area grows larger, a possibility that devitrification appears in the substrate becomes higher, and the good merchandize rate is rapidly decreased. Therefore, improvement in devitrification has great merits for manufacturing a large-sized substrate glass. A larger size is advantageous, such as the area of 0.1 $m^2$ or more (specifically, size of 320 mm×420 mm or more), particularly 0.5 $m^2$ or more (specifically, size of 630 mm×830 mm or more), 1.0 $m^2$ or more (specifically, size of 950 mm×1150 mm or more), further 2.3 $m^2$ or more (specifically, size of 1400 mm×1700 mm or more), 3.5 $m^2$ or more (specifically, size of 1750 mm×2050 mm or more), 4.8 $m^2$ or more (specifically, size of 2100 mm×2300 mm or more).

Examples of the suitable glass composition for a display substrate of the present invention include a glass comprising 50 to 70% of $SiO_2$, 10 to 25% of $Al_2O_3$, 8.4 to 20% of $B_2O_3$, 0 to 10% of MgO, 6 to 15% of CaO, 0 to 10% of BaO, 0 to 10% of SrO, 0 to 10% of ZnO, 0 to 5% of $TiO_2$ and 0 to 5% of $P_2O_5$ as expressed in % by mass. This composition was defined in view of properties such as a strain point, a density, a thermal expansion coefficient, chemical resistance, a specific Young's modulus, meltability and formability which are sought as the aforementioned substrate such as a liquid crystal display. The reason why the composition range was defined will be explained below.

The content of $SiO_2$ in the present invention is 50 to 70%. When the content is less than 50%, chemical resistance, particularly acid resistance is deteriorated, and it becomes difficult to reduce the density. On the other hand, when the content is more than 70%, the viscosity at high temperature becomes high, so that meltability is deteriorated and, at the same time, a defect of a devitrified substance (cristobalite) is easily produced in the glass. It is preferable that the content of $SiO_2$ is 58% or more, particularly 60% or more, further 62% or more, and it is preferable that the content is 68% or less, particularly 66% or less.

The content of $Al_2O_3$ is 10 to 25%. When the content is less than 10%, it becomes difficult to adjust the strain point at 640° C. or higher. In addition, $Al_2O_3$ has action of improving the Young's modulus of the glass, and enhancing the specific Young's modulus and, when the content is less than 10%, the Young's modulus is reduced. On the other hand, when the content is more than 19%, the liquidus temperature is elevated, and devitrification resistance is reduced. It is preferable that the content of $Al_2O_3$ is 10% or more, particularly 12% or more, further 14.5% or more, and it is preferable that the content is 19% or less, particularly 18% or less.

$B_2O_3$ exerts as a flux, and is an essential component for reducing the viscosity and improving meltability. On the other hand, a glass substrate employed in a liquid crystal display is required to have high acid resistance and, as an amount of $B_2O_3$ grows larger, there is a tendency that acid resistance is reduced. The content of $B_2O_3$ is 8.4 to 20%. When the content is less than 8.4%, action as a flux becomes insufficient and, at the same time, buffered hydrofluoric acid resistance is deteriorated. On the other hand, when the content is more than 20%, the strain point of the glass is lowered, so that heat resistance is reduced and, at the same time, acid resistance is deteriorated. Further, since the Young's modulus is reduced, the specific Young's modulus is reduced. It is preferable that the content of $B_2O_3$ is 8.6% or more, additionally 15% or less, particularly 14% or less, further 12% or less.

The content of MgO is 0 to 10%. MgO reduces a viscosity at high temperature and improves meltability of the glass without lowering the strain point. In addition, among alkali earth metal oxides, MgO has the greatest effect of lowering the density. However, when MgO is contained at a large amount, the liquidus temperature is elevated, as a result devitrification resistance is reduced. Since MgO has a possibility that it is reacted with buffered hydrofluoric acid to form a product, the product is adhered on an element on the glass substrate surface, and is adhered to the glass substrate to cloud this, its content has limitation. Therefore, it is desirable that the content of MgO is 0 to 2%, preferably 0 to 1%, more preferably 0 to 0.5%, further MgO is not substantially contained.

CaO is also a component which reduces a high temperature viscosity and remarkably improves meltability of the glass without lowering the strain point, like MgO, and its content is 6 to 15%. This kind of an alkali-free glass is generally melted with difficulty. Therefore, in order to supply a glass substrate of high quality at a low cost and a large amount, it is important to enhance meltability of the glass. In the glass composition of the present invention, reduction in $SiO_2$ is most effective for enhancing meltability. However, when the amount of $SiO_2$ is reduced, acid resistance is extremely reduced and, at the same time, the density and the thermal expansion coefficient of the glass are increased, being not preferable. Therefore, in the present invention, in order to enhance meltability of the glass, it is preferable that CaO is contained at 6% or more, particularly 6.5% or more. On the other hand, when the content of CaO is more than 15%, buffered hydrofluoric acid resistance of the glass is deteriorated, so that the glass substrate surface is easily eroded and, at the same time, the reaction product is adhered to the glass substrate surface to cloud the glass and, further, the thermal expansion coefficient becomes too high, being not preferable. The suitable content of CaO is 12% or less, particularly 10% or less, further 9% or less.

Both of BaO and SrO are a component which improves chemical resistance and devitrification resistance of the glass, and each of them is contained at 0 to 10%. However, when these components are contained at a large amount, the density and the thermal expansion coefficient of the glass are increased. It is preferable that the content of BaO is 5% or less, particularly 2% or less, further 1% or less. It is preferable that the content of SrO is 4% or less, particularly 2.7% or less, further 1.5% or less.

In addition, BaO and SrO are a component having nature of enhancing, particularly, BHF resistance. Therefore, in order to improve BHF resistance, it is preferable that the total amount of these components is 0.1% or more (preferably 0.3% or more, more preferably 0.5% or more). However, since when BaO and SrO are contained too much, the density and the thermal expansion coefficient of the glass are increased, it is desirable to suppress the total amount to 6% or less. From a viewpoint of enhancement of BHF resistance, it is desirable that the total amount of BaO and SrO is as much as possible in the range. On the other hand, from a viewpoint of reduction in a density and a thermal expansion coefficient, it is desirable that the total amount is as little as possible.

ZnO is a component which improves buffered hydrofluoric acid resistance of the substrate glass and, at the same time, improves meltability. When contained at a large amount, the glass is easily devitrified, the strain point is lowered, and the density is increased, being not preferable. Therefore, the content is 0 to 7%, preferably 0 to 5%, more preferably 3% or less, further preferably 0.9% or less, most preferably 0.5% or less.

Respective components of MgO, CaO, BaO, SrO and ZnO have the effect of improving meltability and formability of the glass by remarkably lowering the liquidus temperature of the glass and making it difficult for a devitrified substance to be produced in the glass, by combination thereof. However, when the total amount of them is small, action as a flux is not sufficient, so that meltability is deteriorated and, at the same time, the thermal expansion coefficient is reduced too much, as a result compatibility of the coefficient with a TFT material is reduced. On the other hand, when the total amount is too much, the density is increased, and the weight of the glass substrate cannot be reduced and, moreover, the specific Young's modulus is reduced, being not preferable. It is preferable that the total amount of these components is 6 to 20%, particularly 6 to 15%, further 6 to 12%.

$TiO_2$ is a component which improves chemical resistance, particularly acid resistance of the glass, and reduces the viscosity at high temperature to improve meltability, but when it is contained at a large amount, the glass is colored, and its transmittance is reduced, therefore, the glass is not preferable as a glass substrate for display. Therefore, the content of $TiO_2$ should be defined at 0 to 5%, preferably 0 to 3%, more preferably 0 to 1%.

$P_2O_5$ is a component which improves devitrification resistance of the glass, but when contained at a large amount, phase separation and cloud occur in the glass and, at the same time, acid resistance is remarkably deteriorated, being not preferable. Therefore, the amount of $P_2O_5$ should be defined at 0 to 5%, preferably 0 to 3%, more preferably 0 to 1%.

In the present invention, in addition to the aforementioned components, various components may be added as far as glass properties are not deteriorated.

For example, $Y_2O_3$, $Nb_2O_3$ and $La_2O_3$ may be contained at a total amount of around 5% or less. These components have action of enhancing the strain point and the Young's modulus, but when contained at a large amount, the density is increased, being not preferable.

In addition, the glass of the present invention can contain $SnO_2$ at less than 0.3%, particularly not less than 0.005 and less than 0.3, more preferably 0.01 to 0.28%. In the present invention, $SnO_2$ is not an essential component, but is a component which can be added as a refining agent. In addition, when the glass is electrically melted using a $SnO_2$ electrode, $SnO_2$ which is an electrode component is dissolved out into the glass. A content of $SnO_2$ is closely related with devitrification of the glass due to $ZrO_2$ and, as the amount of $SnO_2$ is larger, the glass is easily devitrified. This tendency is remarkably manifested, particularly, in the glass in the aforementioned composition range. As in the case of $ZrO_2$, from a viewpoint of improvement in devitrification, the smaller amount of $SnO_2$ is better. However, $SnO_2$ is one of a few refining agents which exert the refining effect in a high temperature region, and high refining effect can be expected at a small amount. Therefore, for the glass of the present invention which is refined with difficulty due to necessity of high temperature melting, it is desired that $SnO_2$ is contained at 0.005% or more for improving refining property and decreasing a use amount of $As_2O_3$ which is an environmental loading substance. Refining effect of $SnO_2$ is the same even in the case of $SnO_2$ which has dissolved out from an electrode.

Further, the glass of the present invention may contain $As_2O_3$, $Sb_2O_3$, $Sb_2O_5$, $F_2$, $Cl_2$, $SO_3$, C, Al and Si as a refining agent at a total amount of up to 5%. Alternatively, the glass may contain $CeO_2$ and $Fe_2O_3$ as a refining agent at a total amount of up to 5%.

Then, a method for producing a glass for a display substrate of the present invention will be explained.

First, glass raw materials are mixed so that the glass having a $SiO_2$—$Al_2O_3$—$B_2O_3$—RO (RO is at least one of MgO, CaO, BaO, SrO and ZnO) based composition and a temperature corresponding to $10^{2.5}$ poise of 1580° C. or higher is obtained, or the glass having a density of 2.5 g/cm³ or less, an average thermal expansion coefficient in a temperature range of 30 to 380° C. of 25 to 36×$10^{-7}$/° C., and a strain point of 640° C. or higher is obtained. It is important that the glass raw materials are mixed so that an alkali content of the resultant glass is 0.01 to 0.2% as expressed in % by mass.

The glass raw materials are desirably mixed so that the $SiO_2$—$Al_2O_3$—$B_2O_3$—RO based glass containing 50 to 70% of $SiO_2$, 10 to 25% of $Al_2O_3$, 8.4 to 20% of $B_2O_3$, 0 to 10% of MgO, 6 to 15% of CaO, 0 to 10% of BaO, 0 to 10% of SrO, 0 to 10% of ZnO, 0 to 5% of $TiO_2$, and 0 to 5% of $P_2O_5$ is obtained.

In addition, for the purpose of reducing the viscosity of the glass, it is preferable to select or treat the raw materials so that a large amount of water is brought into the glass. Specifically, the raw materials having a high water content (e.g. hydroxide raw material) may be selected, or a moisture may be added to the raw materials.

Further, there is a possibility that a content of a $ZrO_2$ component which is a cause for devitrification is increased by dissolution out from a refractory at a later melting step. For this reason, it is important to extremely restrict mixing in of the $ZrO_2$ component from the glass raw materials and, also when used aiming at improving chemical durability, it is necessary that its addition amount is restricted to a minimum.

Then, the mixed glass raw materials are melted and vitrified in a melting furnace constructed of a high zirconia refractory. As the high zirconia refractory, it is preferable to use a $ZrO_2$ electrocast refractory which is excellent in erosion resistance and can be used for a long term. Alternatively, dense zircon having a short life may be used in place of the high zirconia refractory. As melting, electric melting is adopted in which $SnO_2$ electrodes and Pt electrodes are used alone or in combination of them to directly pass electricity through the glass to heat the glass. It goes without saying that combustion of heavy oil or gas may be used together to melt the glass. In addition, a moisture amount in the atmosphere in the furnace may be increased by using oxygen combustion, or water steam may be introduced directly into the furnace, or water steam bubbling may be performed in a molten glass so that a large amount of water is introduced into the glass.

Then, the molten glass is refined and homogenized. Although a refining and homogenizing step may be performed in a vessel made of a refractory such as a high zirconia refractory, the step is desirably performed in a platinum or platinum alloy vessel in order to prevent further dissolution out of $ZrO_2$ into the glass. The platinum vessel means a vessel in which a surface contacts with a glass is constructed of platinum, for example, a vessel in which a refractory surface is covered with platinum or platinum alloy.

Thereafter, the molten glass is formed into a desired shape to obtain a substrate glass. When used in utility of display, the glass may be formed into a thin sheet using a method such as an overflow down-draw process, a slot down-draw process, a float process, and a roll out process. In particular, when formed by the overflow down-draw process, a glass sheet very excellent in surface quality is obtained even when unpolished, being preferable.

In the thus prepared substrate glass of the present invention, it becomes easy to pass electricity through the glass at electric melting due to the presence of an alkali component. For this reason, it does not occur that the content of $ZrO_2$ in the glass is excessively increased to intensity devitrification property. In the aforementioned method, it is desirable that the β-OH value of the resultant glass is adjusted at 0.20/mm or more, the content of $ZrO_2$ is adjusted at not less than 0.01 and less than 0.4% (particularly 0.3% or less), and a content of $SnO_2$ is adjusted at less than 0.3%.

The resultant substrate glass is cut into an appropriate size, subjected to end face treatment, and is used as a substrate for a liquid crystal display, an EL display or the like.

Example 1

Table 1 shows influence of $ZrO_2$ on devitrification property of a glass. A glass 1 is a glass containing 60% of $SiO_2$, 15% of $Al_2O_3$, 10% of $B_2O_3$, 5% of CaO, 5% of BaO, and 5% of SrO as expressed in % by mass, and having a density of 2.5 g/cm³, a thermal expansion coefficient at 30 to 380° C. of 37×$10^{-7}$/° C., a strain point of 660° C., and a temperature corresponding to $10^{2.5}$ poise of about 1570° C., and a glass 2 is a glass containing 64% of $SiO_2$, 16% of $Al_2O_3$, 11% of $B_2O_3$, 8% of CaO, and 1% of SrO, and having a density of 2.4 g/cm³, a thermal expansion coefficient at 30 to 380° C. of 32×$10^{-7}$/° C., a strain point of 675° C., and a temperature corresponding to $10^{2.5}$ poise of about 1600° C. In any glass, an alkali content is less than 0.01%.

TABLE 1

|  |  | Glass 1 | Glass 2 |
|---|---|---|---|
| $ZrO_2$ Content (% by mass) | 0.0 |  |  |
|  | 0.1 |  |  |
|  | 0.2 |  |  |
|  | 0.3 |  | ≦1000 |
|  | 0.4 |  | 1100 |
|  | 0.5 |  | 1110 |
|  | 0.6 | ≦1000 | 1160 |
|  | 0.7 | 1100 | 1180 |
|  | 0.8 | 1140 | >1190 |
|  | 0.9 | >1180 |  |

Each sample was prepared as follows. First, glass raw materials were mixed by changing a $ZrO_2$ amount so that the aforementioned composition was obtained. This raw material batch was put into a platinum crucible, melted at 1600° C. for 24 hours, and the melt was formed. Thereafter, the resultant glass was crushed, passed through a standard sieve of 30 mesh (500 μm), the glass powder remaining on 50 mesh (300 μm) was put into a platinum boat, retained in a temperature gradient furnace for 24 hours, and taken out. Regarding the resultant samples, a maximum temperature at which a $ZrO_2.SiO_2$ crystal was seen by microscope observation is shown.

From the above results, it was confirmed that the glass 2 having a low density, a low expansion, and a high strain point is devitrified at a smaller $ZrO_2$ amount than that of the glass 1.

Example 2

Tables 2 and 3 show Examples (sample Nos. 2 to 4, and 6 to 8) of a glass for display of the present invention. Sample Nos. 1 and 5 are Comparative Examples.

TABLE 2

|  | 1 | 2 | 3 | 4 |
|---|---|---|---|---|
| (% by mass) | | | | |
| $SiO_2$ | 64 | 64 | 64 | 64 |
| $Al_2O_3$ | 16 | 16 | 16 | 16 |
| $B_2O_3$ | 10 | 10 | 10 | 10 |
| CaO | 7 | 7 | 7 | 7 |
| BaO | 1 | 1 | 1 | 1 |
| SrO | 1 | 1 | 1 | 1 |
| $Li_2O$ | 0.0005 | 0.005 | 0.001 | 0.007 |
| $Na_2O$ | 0.005 | 0.02 | 0.05 | 0.06 |
| $K_2O$ | 0.001 | 0.005 | 0.01 | 0.01 |
| $ZrO_2$ | 0.4 | 0.12 | 0.1 | 0.05 |
| $SnO_2$ | 0.1 | 0.2 | 0.05 | 0.01 |
| $As_2O_3$ | 0.1 | 0.1 | 0.1 | 0.1 |
| $Sb_2O_3$ | 0.9 | 0.9 | 0.9 | 0.9 |
| $Cl_2$ | 0.1 | 0.05 | — | — |
| β-OH Value (/mm) | 0.25 | 0.30 | 0.50 | 0.45 |
| Melting Temperature(° C.) | 1608 | 1605 | 1600 | 1603 |
| Density(g/cm³) | 2.4 | 2.4 | 2.4 | 2.4 |
| Thermal Expansion Coefficient ($\times 10^{-7}$/° C.) | 38 | 38 | 38 | 38 |
| Strain Point(° C.) | 670 | 669 | 665 | 665 |
| Young's Modulus (GPa) | 71 | 71 | 71 | 71 |
| Devitrification Property | Presence | Absence | Absence | Absence |

TABLE 3

|  | 5 | 6 | 7 | 8 |
|---|---|---|---|---|
| (% by mass) | | | | |
| $SiO_2$ | 64 | 64 | 64 | 64 |
| $Al_2O_3$ | 16 | 16 | 16 | 16 |
| $B_2O_3$ | 10 | 10 | 10 | 10 |
| CaO | 7 | 7 | 7 | 7 |
| BaO | 1 | 1 | 1 | 1 |
| SrO | 1 | 1 | 1 | 1 |
| $Li_2O$ | 0.0006 | 0.005 | 0.001 | 0.006 |
| $Na_2O$ | 0.006 | 0.02 | 0.05 | 0.05 |
| $K_2O$ | 0.001 | 0.005 | 0.01 | 0.01 |
| $ZrO_2$ | 0.4 | 0.12 | 0.1 | 0.05 |
| $SnO_2$ | 0.2 | 0.2 | 0.2 | 0.2 |
| $As_2O_3$ | 0.7 | 0.7 | 0.7 | 0.7 |
| $Sb_2O_3$ | 0.5 | 0.5 | 0.5 | 0.5 |
| $Cl_2$ | 0.1 | 0.05 | — | — |
| β-OH Value (/mm) | 0.25 | 0.30 | 0.50 | 0.45 |
| Melting Temperature(° C.) | 1606 | 1605 | 1601 | 1602 |
| Density(g/cm³) | 2.4 | 2.4 | 2.4 | 2.4 |
| Thermal Expansion Coefficient ($\times 10^{-7}$/° C.) | 38 | 38 | 38 | 38 |
| Strain Point(° C.) | 671 | 669 | 666 | 665 |
| Young's Modulus (GPa) | 71 | 71 | 71 | 71 |
| Devitrification Property | Presence | Absence | Absence | Absence |

Each sample glass in Tables was prepared as follows.

First, glass raw materials such as silica sand, aluminum hydroxide and aluminum oxide, boric acid, calcium carbonate, strontium carbonate, barium carbonate, stannic oxide, soda ash, lithium carbonate, and potassium carbonate were compounded and mixed so that a composition in Tables was obtained. Then, the mixture was melted at a maximum temperature of 1650° C. by performing direct electricity passing heating in an electric melting furnace constructed of a $ZrO_2$ electrocast refractory and having a $SnO_2$ electrode. Upon melting, oxygen combustion was used jointly. Further, the molten glass was introduced into a refractory vessel lined with platinum, and refining and homogenization were performed. Subsequently, the molten glass was formed into a sheet by an overflow down-draw process, and cut to obtain a substrate glass having a size of 1100×1250×0.7 mm. Regarding glasses, properties such as a β-OH value, contents of $ZrO_2$ and $SnO_2$, and devitrification property of the glass were evaluated.

As a result, it was seen that samples Nos. 2 to 4, and 6 to 8 which are Examples of the present invention are better in devitrificaton property.

Contents of $ZrO_2$ and $SnO_2$ of the resultant glass were confirmed by fluorescent X-ray analysis.

The β-OH value of the glass was obtained using the following equation by measuring the glass transmittance using FT-IR.

$$\beta\text{-OH value} = (1/X)\log 10(T_1/T_2)$$

X: glass thickness (nm)
$T_1$: transmittance at reference wavelength of 3846 cm$^{-1}$ (%)
$T_2$: minimum transmittance at hydroxy group absorbing wavelength of around 3600 cm$^{-1}$ (%)

A melting temperature (temperature corresponding to $10^{2.5}$ poise) was measured by a platinum ball pulling up method.

A density was measured by the well-known Archimedes method.

A thermal expansion coefficient was measured with a dilatometer using a cylindrical sample formed into a size of a diameter of 5.0 mm and a length of 20 mm, and an average thermal expansion coefficient at 30 to 380° C. was obtained from the resultant thermal expansion curve.

A strain point was measured based on a method of ASTM C336-71.

A Young's modulus was obtained by a resonance method.

Regarding devitrification property, a sample which had been processed into a powder as in Example 1 was put into a platinum boat, this was retained in a temperature gradient furnace for 24 hours, and taken out therefrom, thereafter, the presence or the absence of a crystal (devitrifying substance) was observed with a microscope.

The glass for a display substrate of the present invention can be used not only as a display substrate, but also as a glass substrate material for an image sensor of a charge coupling device (CCD), and an equivalent close-type solid image pickup device (CIS), or for a solar cell.

What is claimed is:

1. A glass for a display substrate characterized as having a $SiO_2$—$Al_2O_3$—$B_2O_3$—RO (RO is at least one of MgO, CaO, BaO, SrO and ZnO) based composition and having an alkali metal content of 0.01 to 0.2% and a $ZrO_2$ content of not less than 0.01% and less than 0.4%, as expressed in % by mass, and its temperature corresponding to $10^{2.5}$ poise being 1570° C. or higher.

2. The glass for a display substrate according to claim 1, wherein the $ZrO_2$ content as expressed in % by mass is 0.01 to 0.3%.

3. The glass for a display substrate according to claim 1, wherein the glass contains, as an alkali metal component, 0.007 to 0.2% of $Na_2O$, 0 to 0.05% of $Li_2O$ and 0 to 0.05% of $K_2O$ as expressed in % by mass.

4. The glass for a display substrate according to claim 1, wherein a β-OH value of the glass is 0.20/mm or more.

5. The glass for a display substrate according to claim 1, wherein the glass comprises 50 to 70% of $SiO_2$, 10 to 25% of $Al_2O_3$, 8.4 to 20% of $B_2O_3$, 0 to 10% of MgO, 6 to 15% of CaO, 0 to 10% of BaO, 0 to 10% of SrO, 0 to 10% of ZnO, 0 to 5% of $TiO_2$, and 0 to 5% of $P_2O_5$ as expressed in % by mass.

6. The glass for a display substrate according to claim 1, which is 0.1 $m^2$ or more in area.

7. The glass for a display substrate according to claim 1, which is used as a liquid crystal display substrate or an EL display substrate.

8. A method for using a glass for a display substrate, which comprises forming the glass for a display substrate as defined in claim 1 into a substrate for a liquid crystal display or an EL display.

* * * * *